Patented Aug. 14, 1928.

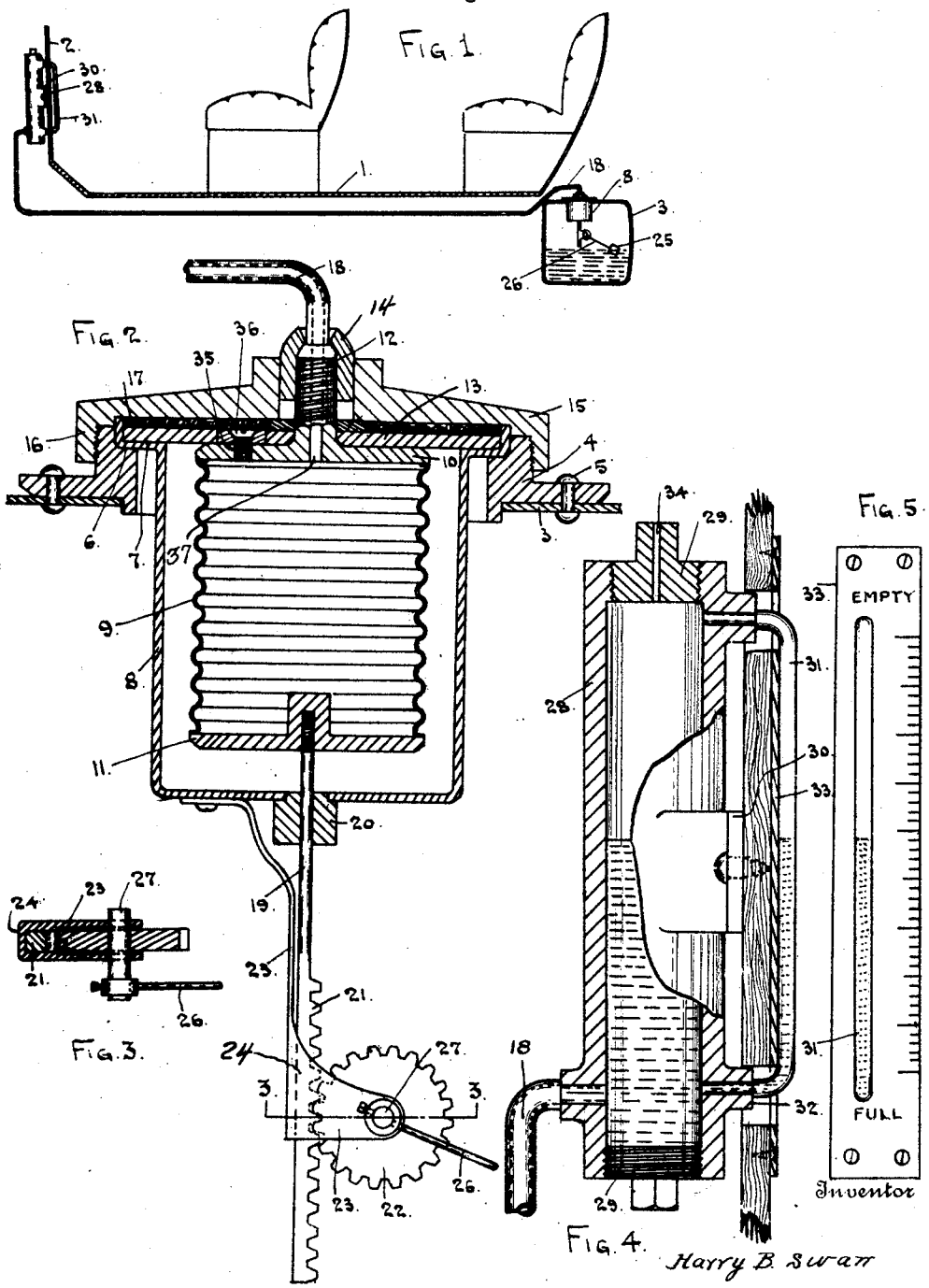

1,680,485

UNITED STATES PATENT OFFICE.

HARRY B. SWAN, OF DETROIT, MICHIGAN.

LIQUID-LEVEL GAUGE.

Application filed August 16, 1922. Serial No. 582,172.

This invention relates to depth indicating apparatus and more particularly relates to devices for use on motor vehicles for indicating at the dash the contents of a liquid fuel tank remote from the dash.

The invention consists in the structural features and arrangement of parts hereinafter described and shown in the accompanying drawings, wherein:—

Figure 1 is a diagrammatic view in elevation of a vehicle body equipped with the improved apparatus;

Figure 2 is a vertical sectional view of the controlling means which is associated with the liquid fuel tank;

Figure 3 is a cross section view on line 3—3 of Figure 2;

Figure 4 is a sectional elevation of the indicating gauge mounted on the instrument board of the vehicle body;

Figure 5 is a front view of the index plate of the gauge, showing its relation to the indicating tube.

In these views the reference character 1 designates a motor vehicle body, 2 the instrument board and 3 the liquid fuel tank. In the top of the latter there is provided an opening marginal to which a ring 4 is secured to the tank as by rivets 5. Said ring is interiorly formed with an annular shoulder 6 forming a seat engageable by an annular shoulder 7 formed at the upper end of a cylindrical cup shaped casing 8, said casing thus being suspended within the tank 3 upon said ring. Within the casing 8 there is arranged a sheet metal cylindrical liquid container 9, commonly known as a "sylphon", the same being annularly corrugated to adapt it to be vertically expanded and contracted. The upper and lower ends of the container 9 are closed respectively by heads 10 and 11, the upper head having a central upstanding nipple 12 exteriorly threaded and formed with a central passage opening into the container 9, said nipple passing centrally through the circular cover plate 13 which seats upon the shoulder 7. 14 is a clamping nut engaging the nipple 12 and tightened against the plate 13 to clamp the top head 10 of the container 9 against the under side of said plate. 15 is a cap which is also centrally apertured to accommodate the nipple 12 and which is provided with an internally threaded marginal flange 16 for exteriorly engaging the ring 4. Between said cap and the plate 13 a disk 17 of suitable packing material is clamped. 18 is a tube, preferably flexible, communicating at one end with the nipple 12 and extending to the instrument board for connection at its other end with a gauge presently to be described.

From the bottom head 11 of the container 9 a plunger rod 19 extends downwardly passing slidably through a bearing 20 centrally carried by the bottom of the casing 8. Some distance below said casing said plunger rod assumes the form of a rack 21 which is in mesh with a pinion 22 journaled in a bracket 23 rigidly depending from the casing 8. Said bracket has an integral U-shaped lateral extension 24 embracing the rack 21 and holding the same properly intermeshed with the pinion 22. 25 is a float carried by an arm 26 which is rigidly secured to the shaft 27 of the pinion 22.

Upon the instrument board there is mounted a gauge comprising a vertically disposed cylindrical vessel 28 having its extremities plugged, as indicated at 29, and formed intermediately with supporting lugs 30 whereby said vessel is screwed or otherwise secured to the instrument board. The tube 18 is in communication with the lower end portion of said vessel and the upper and lower end portions thereof are in communication through a gauge glass 31, the ends of which are bent to communicate with bored bosses 32 which project through the instrument board. Thus the only portion of the gauge visible from the driver's seat is the gauge glass 31. 33 is an index plate which is mounted upon the instrument board in back of the gauge glass 31. A suitable series of transverse markings may be provided upon said plate in back of the glass to accurately show the quantity of liquid fuel in the tank 3 corresponding to any liquid level in said gauge glass.

Considering now the operation of the described apparatus, as the liquid level in the tank rises and falls the resulting vertical movement of the float 25 proportionately rocks the arm 26 and the pinion 22. The latter effects a corresponding upward or downward shifting of the rack 21 and plunger 19 and the head 11 rising or falling with said plunger effects a compression or expansion of the container 9 whereby a quantity of some suitable liquid which fills the container 9, tube 18 and vessel 28 is either expelled from or admitted to said container.

If the tank 3 is being filled the container 9 will be expanded and the resulting admission of liquid to said container will deplete the contents of the vessel 28 causing the liquid level in said vessel and in the glass 31 to fall. On the other hand as the liquid fuel within the tank 3 is depleted the container 9 is contracted and the resulting expulsion of liquid therefrom produces a rise of the liquid level within the vessel 28 which rise will be indicated by the gauge glass 31. Thus the operator of a vehicle will be constantly accurately informed as to the quantity of liquid fuel remaining available.

To avoid any trapping of air in the upper portion of the vessel 28 and resulting interference with the accuracy of the described apparatus, it is preferred to provide a vent opening in the upper end portion of said vessel. Thus in Figure 4 the upper plug 29 is disclosed as formed with a vent opening 34.

As a provision for preventing trapping of air in the container 9 during the initial filling of the same with liquid an air vent port 35 is provided in the head 10 which is closed by a screw 36 when said container has been filled with liquid.

What I claim as my invention is:—

1. In a device of the class described, a tank having an opening, a ring secured to the tank and surrounding the opening, a casing extending through the opening and having a flange seating on the ring, a plate resting on said flange provided with an aperture and an expansible liquid container in said casing having an apertured head secured to the plate, said head having a tubular projection in line with the aperture in the said head and extending through the aperture in said plate, a cap secured to the ring and having an opening surrounding the tubular projection above the plate and a float operated means for actuating said expansible container in combination with a gauge comprising a vessel, and a gauge glass associated therewith, and a tube connecting said gauge to the tubular projection for admitting and withdrawing liquid to and from said vessel.

2. In a device of the class described, the combination with a tank provided with an opening, a ring secured to the tank and surrounding the opening, a casing extending through the said opening and having a flange seating on the ring, a plate resting on said flange and provided with an aperture, an expansible liquid container in said casing having an apertured head secured to said plate, said head having a tubular projection in line with the aperture in the head and extending through the aperture in said plate, a cap secured to the ring and having an opening surrounding the tubular projection above the plate, float operated means for operating said expansible container, a gauge, and means establishing a connection between said gauge and tubular projection operable by liquid displacement for indicating the contents of the tank.

In testimony whereof I affix my signature.

HARRY B. SWAN.